United States Patent
Ugai

(10) Patent No.: US 8,953,473 B2
(45) Date of Patent: Feb. 10, 2015

(54) COMMUNICATION DEVICE

(75) Inventor: Kazukuni Ugai, Kanagawa (JP)

(73) Assignee: Fujitsu Telecom Networks Limited, Kanagawa (JP)

( * ) Notice: Subject to any disclaimer, the term of this patent is extended or adjusted under 35 U.S.C. 154(b) by 349 days.

(21) Appl. No.: 13/414,558

(22) Filed: Mar. 7, 2012

(65) Prior Publication Data

US 2012/0294171 A1 Nov. 22, 2012

(30) Foreign Application Priority Data

May 19, 2011 (JP) ................. 2011-112348

(51) Int. Cl.
*H04L 12/28* (2006.01)
*H04L 12/66* (2006.01)
*H04L 12/863* (2013.01)
*H04L 12/933* (2013.01)

(52) U.S. Cl.
CPC ........ *H04L 47/6225* (2013.01); *H04L 49/1576* (2013.01); *H04L 49/101* (2013.01)
USPC ........... 370/252; 370/217; 370/228; 370/387; 370/419; 370/463; 714/752; 714/801

(58) Field of Classification Search
CPC ... H04L 69/161; H04L 69/16; H04L 12/5601; H04L 12/5602; H04L 12/5693; H04L 47/22; H04L 47/2441; H04L 47/35; H04L 49/90; H04L 49/9094; H04L 47/621; H04L 49/101; H04L 49/1576; H04Q 11/0478; G06F 11/2023; G06F 11/2035; G06F 11/2046; H04N 21/2404; H04N 21/232; H04N 21/2387; H04N 21/2396

USPC .................................................. 370/228-356
See application file for complete search history.

(56) References Cited

U.S. PATENT DOCUMENTS

| 5,737,747 | A | * | 4/1998 | Vishlitzky et al. | 711/118 |
| 5,829,046 | A | * | 10/1998 | Tzelnic et al. | 711/162 |
| 5,892,915 | A | * | 4/1999 | Duso et al. | 709/219 |
| 5,933,603 | A | * | 8/1999 | Vahalia et al. | 709/225 |
| 5,974,503 | A | * | 10/1999 | Venkatesh et al. | 711/114 |

(Continued)

FOREIGN PATENT DOCUMENTS

| JP | 09-321797 | 12/1997 |
| JP | 10-322369 | 12/1998 |

(Continued)

OTHER PUBLICATIONS

Office action dispatched Jul. 9, 2013 from corresponding Japanese Patent Application No. 2011-112348 and its English summary provided by the client.

*Primary Examiner* — Venkatesh Haliyur
(74) *Attorney, Agent, or Firm* — Ladas & Parry, LLP

(57) ABSTRACT

A plurality of frame buffers of a communication device store input frames for respective flows, which are units of managing communication. A sequential scheduler and an adjustment scheduler cyclically visit the plurality of frame buffers to read a frame for external output from each frame buffer. The sequential scheduler reads one frame per a visit to each frame buffer at a speed lower than a communication speed of the communication device. The adjustment scheduler reads one or more frames per a visit to each frame buffer such that a restriction on read quantity defined by a reference value greater than the shortest frame size is imposed.

4 Claims, 6 Drawing Sheets

(56) References Cited

U.S. PATENT DOCUMENTS

| | | | |
|---|---|---|---|
| 5,987,621 A * | 11/1999 | Duso et al. | 714/4.11 |
| 6,061,504 A * | 5/2000 | Tzelnic et al. | 709/219 |
| 6,230,200 B1 * | 5/2001 | Forecast et al. | 709/226 |
| 6,625,750 B1 * | 9/2003 | Duso et al. | 714/11 |
| 6,999,413 B2 * | 2/2006 | Moriwaki et al. | 370/228 |
| 7,130,903 B2 * | 10/2006 | Masuda et al. | 709/225 |
| 7,295,574 B1 * | 11/2007 | Parruck et al. | 370/474 |
| 7,382,787 B1 * | 6/2008 | Barnes et al. | 370/401 |
| 8,218,546 B2 * | 7/2012 | Opsasnick | 370/392 |
| 8,270,401 B1 * | 9/2012 | Barnes et al. | 370/389 |
| 8,291,285 B1 * | 10/2012 | Varnica et al. | 714/752 |
| 8,495,453 B1 * | 7/2013 | Varnica et al. | 714/752 |
| 8,634,431 B1 * | 1/2014 | Chiang et al. | 370/412 |
| 2001/0007560 A1 * | 7/2001 | Masuda et al. | 370/401 |
| 2002/0057712 A1 * | 5/2002 | Moriwaki et al. | 370/463 |
| 2007/0104211 A1 * | 5/2007 | Opsasnick | 370/412 |

FOREIGN PATENT DOCUMENTS

| | | |
|---|---|---|
| JP | 11-346227 | 12/1999 |
| JP | 2001-339427 | 12/2001 |
| JP | 2002-198993 | 7/2002 |
| JP | 2002-232470 | 8/2002 |
| JP | 2002-237839 | 8/2002 |
| JP | 2004-153482 | 5/2004 |

* cited by examiner

COMMUNICATION SYSTEM 100

FIG.5

| QUEUE BUFFER | STORED FRAMES | FIRST PERIOD SCHEDULER - NUMBER OF READ FRAME - CUMULATIVE AMOUNT | SECOND PERIOD SCHEDULER - NUMBER OF READ FRAME - CUMULATIVE AMOUNT | THIRD PERIOD SCHEDULER - NUMBER OF READ FRAME - CUMULATIVE AMOUNT | FOURTH PERIOD SCHEDULER - NUMBER OF READ FRAME - CUMULATIVE AMOUNT | FIFTH PERIOD SCHEDULER - NUMBER OF READ FRAME - CUMULATIVE AMOUNT | SIXTH PERIOD SCHEDULER - NUMBER OF READ FRAME - CUMULATIVE AMOUNT | SEVENTH PERIOD SCHEDULER - NUMBER OF READ FRAME - CUMULATIVE AMOUNT |
|---|---|---|---|---|---|---|---|---|
| #1 | 84 BYTES×1 | S1-1-84 | | | | | | |
| #2 | 84 BYTES×1 | | S1-1-84 | | | | | |
| #3 | 84 BYTES×1 | | | S1-1-84 | | | | |
| #4 | 500 BYTES×1 (+500 BYTES×1) | | | | S1-1-500 | | | S2-1-160 |
| #5 | 1000 BYTES×2 | S2-1-160 | | | | S1-1-1160 | | |
| #6 | 1000 BYTES×2 | | S2-1-160 | | | | S1-1-1160 | |
| #7 | 1000 BYTES×2 | | | S2-1-160 | | | | S1-1-1160 |
| #8 | 500 BYTES×5 | | | | S2-2-160 | | | |
| #9 | 500 BYTES×5 | | | | | S2-2-160 | | |
| #10 | 500 BYTES×5 | | | | | | S2-2-160 | |

FIG.6

| QUEUE BUFFER | STORED FRAMES | EIGHTH PERIOD SCHEDULER-NUMBER OF READ-FRAME-CUMULATIVE AMOUNT | NINTH PERIOD SCHEDULER-NUMBER OF READ-FRAME-CUMULATIVE AMOUNT | TENTH PERIOD SCHEDULER-NUMBER OF READ-FRAME-CUMULATIVE AMOUNT | ELEVENTH PERIOD SCHEDULER-NUMBER OF READ-FRAME-CUMULATIVE AMOUNT | TWELFTH PERIOD SCHEDULER-NUMBER OF READ-FRAME-CUMULATIVE AMOUNT | THIRTEENTH PERIOD SCHEDULER-NUMBER OF READ-FRAME-CUMULATIVE AMOUNT |
|---|---|---|---|---|---|---|---|
| #1 | 84 BYTES×1 | | | | | | |
| #2 | 84 BYTES×1 | | | | | | |
| #3 | 84 BYTES×1 | | | | | | |
| #4 | 500 BYTES×1 (+500 BYTES×1) | | | | | | |
| #5 | 1000 BYTES×2 | S2-0-320 | | | | | |
| #6 | 1000 BYTES×2 | | S2-0-320 | | | | |
| #7 | 1000 BYTES×2 | | | S2-0-320 | | | |
| #8 | 500 BYTES×5 | S1-1-660 | | | S1-1-1160 S2-0-320 | | |
| #9 | 500 BYTES×5 | | S1-1-660 | | | S1-1-1160 S2-0-320 | |
| #10 | 500 BYTES×5 | | | S1-1-660 | | | S1-1-1160 S2-0-320 |

COMMUNICATION DEVICE

CROSS-REFERENCE TO RELATED APPLICATIONS

This application claims to priority to Japanese Patent Application No. 2011-112348 filed on May 19, 2011 the disclosure of which is incorporated herein by reference in its entirety.

FIELD OF THE INVENTION

The present invention relates to data communication technology and, more particularly, to communication devices.

DESCRIPTION OF THE RELATED ART

As a result of increasingly widespread use of broadband services using optical fibers, the maximum speed of access line available for communication has grown from 100 Mbps to 1 Gbps. Further, due to the standardization of 10 Gigabit Ethernet-Passive Optical Network (GE-PON) (Ethernet is a registered trademark), the speed of access line is expected to grow further.

Basically, Internet access is a best effort service. Traffic flows of a plurality of subscribers share a limited communication band for communication. In such a mode of communication, a communication device is sometimes used that limits the band such that the traffic flows of the subscribers are given equal weights instead of guaranteeing a band as in a leased line. The term "band" as used in this specification can be said to refer to a volume of communication per a unit period of time.

[patent document No. 1] JP2004-153482

One known related-art technique to implement balanced band control is a Weighted Round Robin (WRR) queue buffer read control scheme. In this scheme, a queue buffer temporarily stores a frame of each input, which is defined as a logical subscription line (logical communication session between a subscriber device and another device). A frame input to a communication device is stored in a queue buffer for each input flow. A scheduler ensures uniform output data volume in the flows by periodically and cyclically selecting a queue buffer from which to read the frame.

Assuming that the amount of data read per period (in this case, "X") is larger than the shortest frame size, the amount of read data will be smaller than X if the frame is read from a queue buffer storing one frame with the shortest size. In other words, only the amount of data smaller than the output band is read, creating an unused output band. Allocation of the unused band to the frame of another queue buffer would require a scheme capable of dynamic and balanced allocation depending on the amount of unused resources. Such a scheme will likely become complicated, nor has there been a proper scheme.

One possible approach would be to impose constraints such that a frame is read only from a queue buffer in which the size of the stored frame is equal to or more than X. In this case, however, the frame will not be read from a queue buffer in which the amount of stored frame is smaller than X. By ensuring that X is equal to the shortest frame size, no output bands will be left unused. As the communication speed is increased, however, the time that can be spent to process the shortest frame (hereinafter, referred to as "frame processing window") will be reduced, meaning that the duration of one period will be reduced. As it is envisaged that the communication speed will further be increased, it will be difficult with the related-art approach to determine a queue buffer from which to read a subsequent frame within the frame processing window.

SUMMARY OF THE INVENTION

The present invention addresses the problem described above and a primary purpose thereof is to provide a technique capable of facilitating balanced band control and improvement in communication speed in communication devices.

The communication device according to an embodiment of the present invention addressing the above problem comprises: a plurality of frame buffers configured to store input frames for respective flows, which are units of managing communication; and first and second schedulers configured to cyclically visit the plurality of frame buffers to read a frame for external output from each frame buffer. The first scheduler reads one frame per a visit to each frame buffer at a speed lower than a communication speed of the communication device, and the second scheduler reads one or more frames per a visit to each frame buffer such that a restriction on read quantity defined by a reference value greater than the shortest frame size is imposed.

Optional combinations of the aforementioned constituting elements, and implementations of the invention in the form of apparatuses, methods, systems, programs, and recording mediums storing the programs may also be practiced as additional modes of the present invention.

BRIEF DESCRIPTION OF THE DRAWINGS

FIG. 5 shows a specific example of reading a frame in the communication device according to the embodiment; and FIG. 6 shows a specific example of reading a frame in the communication device according to the embodiment.

DETAILED DESCRIPTION OF THE INVENTION

The invention will now be described by reference to the preferred embodiments. This does not intend to limit the scope of the present invention, but to exemplify the invention.

The communication device according to the embodiment comprises two schedulers configured to cyclically visit a plurality of queue buffers to read frames. The first scheduler reads one frame per one period from a queue buffer to read from at a speed (e.g., 1 Gbps) lower than the communication speed of the communication device (e.g., 10 Gbps). In other words, the first scheduler reads, per a period, a frame from the queue buffer to read from, until the amount of read data is equal to or more than a read quantity restriction which is equal to the shortest frame size. Meanwhile, the second scheduler reads, per a period, one or more frames from the queue buffer to read from, until the amount of read data is equal to or more than a read quantity restriction which is larger the shortest frame size.

Since the first scheduler sequentially and cyclically visits the queue buffers so as to read one frame, balance between the plurality of queue buffers in respect of the amount of read frames can be easily maintained. Since the second scheduler reads one or more frames in parallel with the first scheduler, the output band is unlikely to be left unused even if the first scheduler operates at a lower speed than the communication speed of the communication device. Consequently, the output band of the communication device is fully exploited and compatibility with higher speed of the communication device is facilitated at the same time. In other words, scalability (i.e., potential for higher communication speed) is easy to maintain.

It will be assumed that the communication device according to the embodiment is a Layer-2 switch designed to route variable-length Ethernet frames ("Ethernet" is a registered trademark. Hereinafter, simply referred to as "frames"). The communication device may of course be other types of transmission devices for transmitting predetermined communication frames. For example, the communication device may be a Layer-3 switch, a router, etc.

Figure 1:
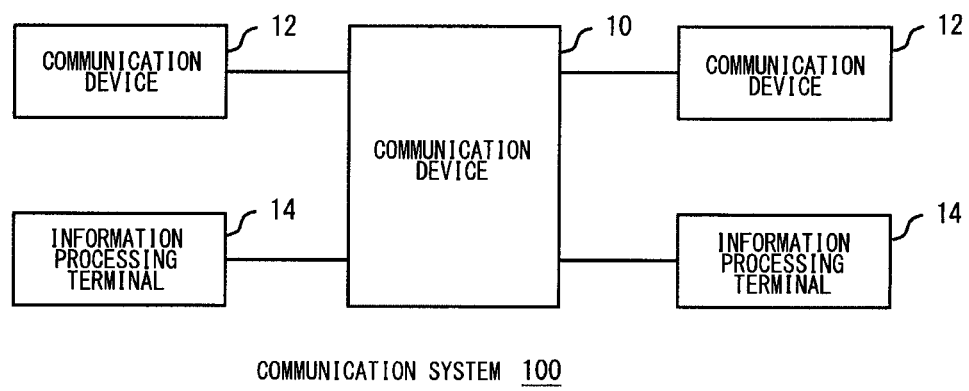
FIG. 1 shows the configuration of the communication system according to an embodiment.

FIG. 1 shows the configuration of the communication system according to the embodiment. A communication device 10 in a communication system is connected to other communication devices 12 and information processing terminals 14 such as a user PC via a transmission channel. The communication device 10 and the other communication devices 12 form a communication network such as a LAN and a WAN. The communication device 10 receives a frame delivered by the other communication device 12 or the information processing terminal 14. The communication device 10 routes the frame to the other communication device 12 or the information processing terminal 14 by referring to the configuration in the frame (VLAN-ID, MAC address, etc.). In this embodiment, it will be assumed that the output band, i.e., the communication speed, of the communication device 10 is 10 Gbps.

Figure 2:
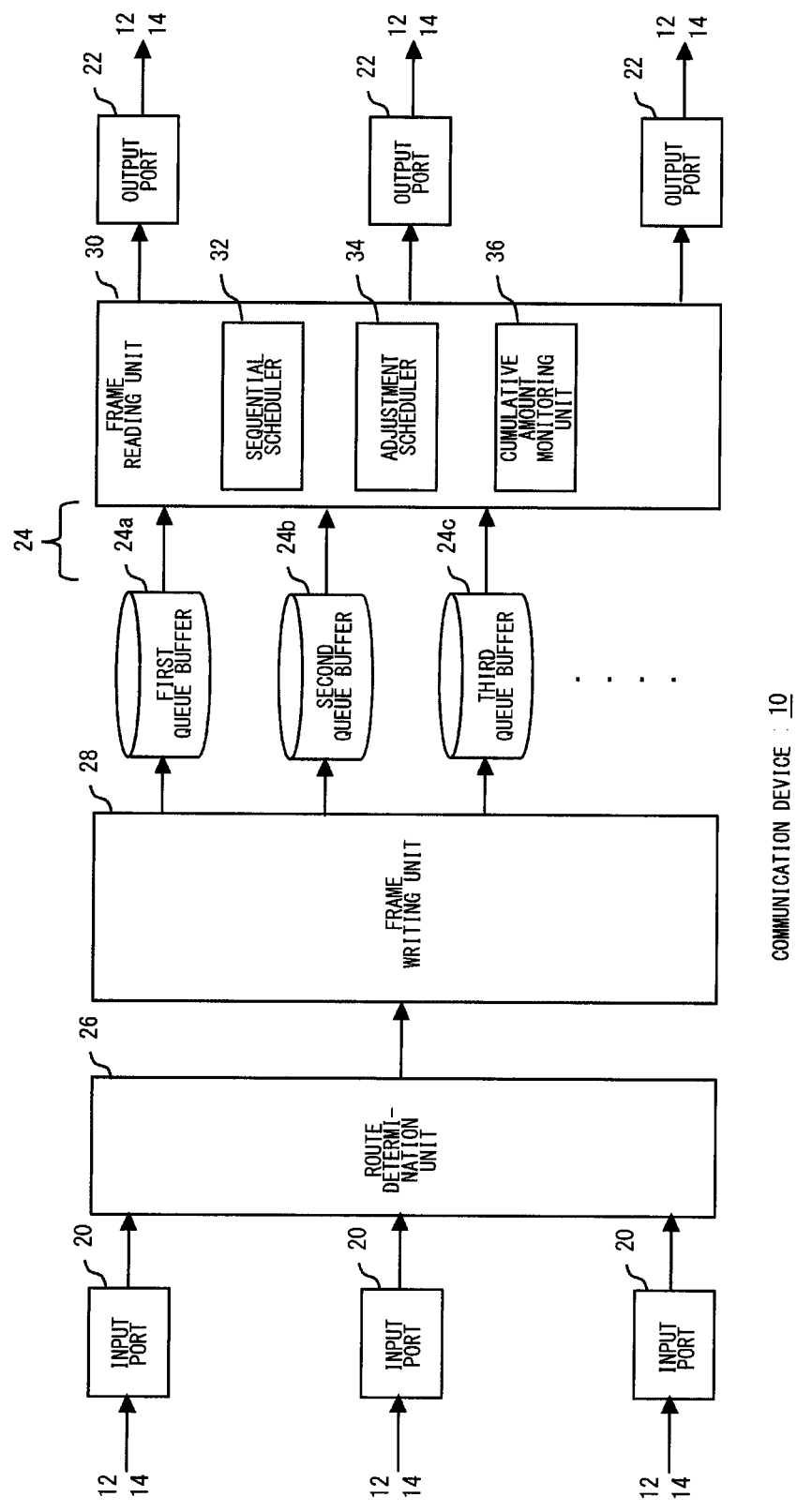
FIG. 2 is a block diagram showing the functions of the communication device 10 of FIG. 1.

FIG. 2 is a block diagram showing the functions of the communication device 10 of FIG. 1. The communication device 10 comprises input ports 20, output ports 22, a first queue buffer 24a, a second queue buffer 24b, a third queue buffer 24c, which are generically referred to as queue buffers 24, a route determination unit 26, a frame writing unit 28, and a frame reading unit 30.

The blocks depicted in the block diagram of this specification are implemented in hardware such as devices or mechanical components like a CPU or a memory of a computer, and in software such as a computer program etc. FIG. 2 depicts functional blocks implemented by the cooperation of these elements. Therefore, it will be obvious to those skilled in the art that the functional blocks may be implemented in a variety of manners by hardware only, software only, or a combination of thereof.

The input port 20 is a communication port configured to receive an Ethernet frame delivered by the other communication device 12 or the information processing terminal 14 to the transmission channel. The output port 22 is a communication port configured to deliver to the transmission channel an Ethernet frame that should be transmitted to the other communication device 12 or the information processing terminal 14. For convenience of explanation, the input port 20 and the output port 22 are illustrated separately. Physically, of course, the input port 20 and the output port 22 may be implemented in a single communication port.

The queue buffer 24 are First in First Out (FIFO) memories configured to temporarily store frame data received by the communication device 10, for each flow determined by the configuration in the frame (VLAN-ID, MAC address, etc.). FIG. 2 shows the first through third queue buffers 24a-24c. Of course, four or more queue buffers may be included for each combination of a source MAC address and a destination MAC address, for each VLAN-ID, etc. The amount of frame data stored in each of the first through third queue buffers 24a-24c is communicated to a cumulative amount monitoring unit 36 described later.

The route determination unit 26 determines the flow and the output port 22 by referring to the destination information (destination MAC address, VLAN-ID, etc.) defined in the frame received by the input port 20. The frame writing unit 28 receives the frame from the route determination unit 26 and stores the frame data in the queue buffer 24 mapped to the flow identified by the router determination unit 26. The frame writing unit 28 communicates the identification information of the queue buffer 24 storing the frame and the size of the stored frame to the cumulative amount monitoring unit 36.

The frame reading unit 30 reads the frame data stored in the queue buffer 24 and causes the output port 22 determined by the route determination unit 26 to deliver the frame data. The frame reading unit 30 includes a sequential scheduler 32, an adjustment scheduler 34, and a cumulative amount monitoring unit 36.

A quantity restriction on a frame processed by the sequential scheduler 32 at a time (i.e., a quantity restriction on a frame read in a single period) is defined as 84 bytes, the shortest frame size. The 84 bytes comprise 64 bytes, which define the shortest Ethernet frame size, and 20 bytes of the inter-frame gap. The sequential scheduler 32 operates at 1 Gbps, which is lower than the communication speed of the communication device 10. More specifically, the sequential scheduler 32 sequentially and cyclically visits the first through third queue buffers 24a-24c, consuming 0.672 microsecond (hereinafter, also denoted as pts) per period. The scheduler 32 reads frame data until the read data exceeds the quantity restriction on a frame read per a visit to a queue buffer 24. In other words, the first scheduler 32 reads one frame from each queue buffer 24. The sequential scheduler 32 communicates the amount of frame data read from the queue buffers 24 to the cumulative amount monitoring unit 36.

The quantity restriction on one or more frames processed by the adjustment scheduler 34 at a time (hereinafter, also referred to as "read reference value") is defined as 840 bytes, ten times the shortest frame size. The adjustment scheduler 34 operates at 10 Gbps, which is the output band. More specifically, the adjustment scheduler 34 sequentially and cyclically visits the first through third queue buffers 24a-24c, consuming 0.672 microsecond per period. The scheduler 34 reads, per a visit to each queue buffer 24, frame data until the read data exceeds a quantity restriction (hereinafter, also referred to as "read quantity restriction") determined by the read reference value and the cumulatively amount of read from each queue buffer 24. By ensuring that the smaller the cumulative amount of read from the queue buffer 24, the larger the amount of frame data read by the adjustment scheduler 24, balanced frame reading from the plurality of queue buffers 24 is achieved. Details will be discussed later.

The cumulative amount monitoring unit 36 maintains information (hereinafter, also referred to as "cumulative frame amount") indicating the amount of frame data stored each of the first through third queue buffers 24a-24c. The cumulative amount monitoring unit 36 increases the cumulative frame amount according to the amount of written frames communicated from the frame writing unit 28, and decreases the cumulative frame amount according to the amount of read frame communicated from the sequential scheduler 32 and the adjustment scheduler 34.

For each of the first through third queue buffers 24a-24c, the cumulative amount monitoring unit 36 maintains information (hereinafter, also referred to as "cumulative read amount") indicating the cumulative amount of frames read by the sequential scheduler 32 and the adjustment scheduler 34. More specifically, the cumulative amount monitoring unit 36 adds the amount of read frame data communicated from the sequential scheduler 32 to the cumulative read amount. Meanwhile, the cumulative amount monitoring unit 36 adds a value obtained by subtracting the read reference value (840 bytes) from the amount of read frame data communicated from the adjustment scheduler 34 to the cumulative read amount. Therefore, the cumulative amount monitoring unit 36 will decrease the cumulative read amount if the amount of read frame is less than the read reference value.

To read a frame from the queue buffers 24, the sequential scheduler 32 and the adjustment scheduler 34 obtain the cumulative frame amount in each queue buffer 24 from the cumulative amount monitoring unit 36. The adjustment scheduler 34 obtains the cumulative read amount in each queue buffer 24 from the cumulative amount monitoring unit 36. The sequential scheduler 32 selects the queue buffer 24 storing a frame, i.e., the queue buffer 24 where the cumulative frame amount is more than 0, as a target of frame read. Meanwhile, the adjustment scheduler 34 selects the queue buffer 24 where the cumulative frame amount+the cumulative read amount is equal to or more than the read reference value (840 bytes) as a target of frame read.

A description will now be given of the operation of the communication device 10 having the configuration as described above. The input port 20 of the communication device receives a communication frame transmitted from the other communication device 12 or the information processing terminal 14 via a transmission channel. The route determination unit 26 determines the output port and the flow by referring to the content of the received communication frame. The frame writing unit 28 refers to a table that maps the plurality of types of flows to the plurality of types of queue buffers and stores the frame in the queue buffer 24 mapped to the flow determined by the route determination unit 26. The frame writing unit 28 communicates the queue buffer 24 that stores the frame and the frame size thereof to the cumulative amount monitoring unit 36.

The cumulative amount monitoring unit 36 maintains the cumulative frame amount and the cumulative read amount in each queue buffer 24 and updates the amounts according to the communication from the frame writing unit 28 and the schedulers. The sequential scheduler 32 determines the queue buffer 24 from which to read a frame in accordance with the cumulative frame amount stored in the cumulative amount monitoring unit 36 and reads the frame data accordingly. The adjustment scheduler 34 determines the queue buffer 24 from which to read a frame and also determines the read quantity restriction in accordance with the cumulative frame amount and the cumulative read amount stored in the cumulative amount monitoring unit 36, and reads the frame accordingly. The frame reading unit 30 causes the frame data read by the sequential scheduler 32 and the adjustment scheduler 34 to be delivered to the other communication device 12 or the information processing terminal 14 via the output port 22.

Figure 3:
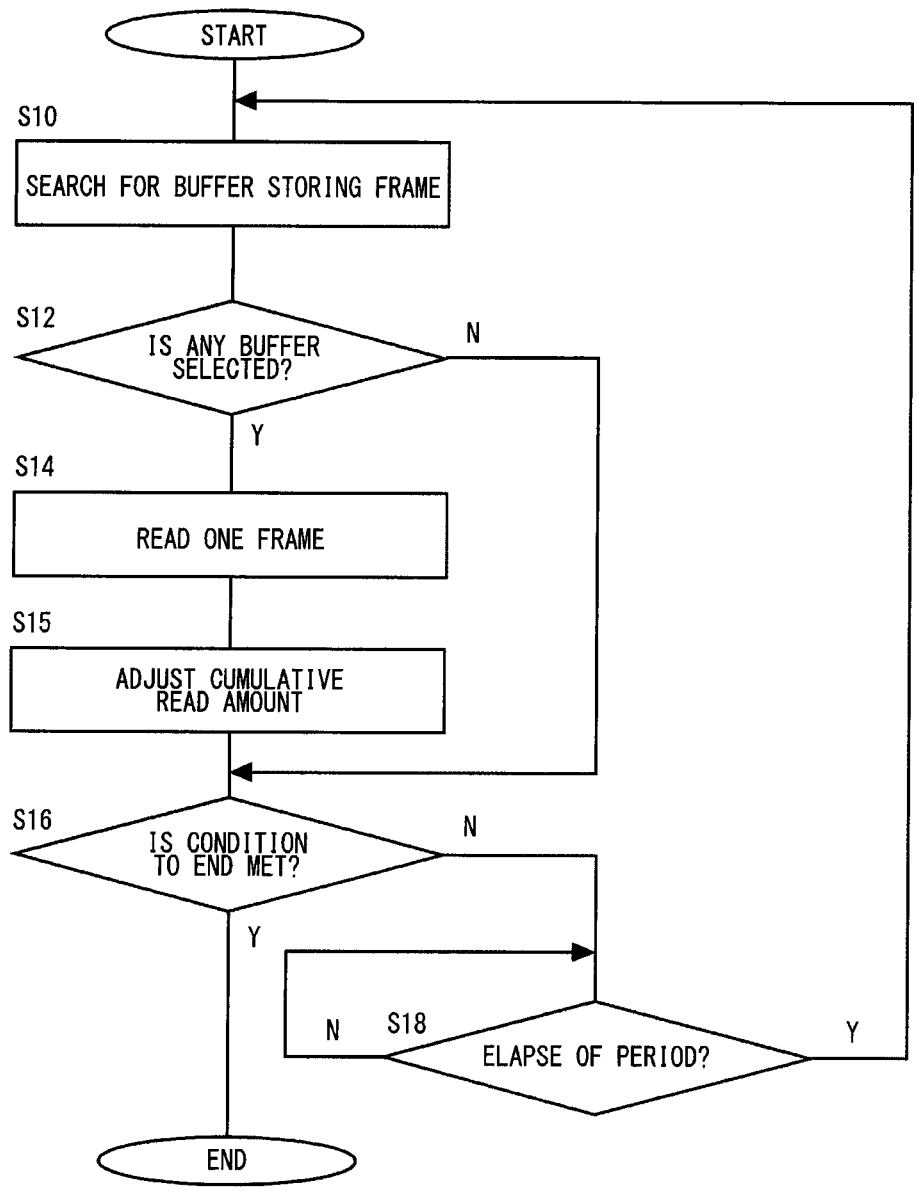
FIG. 3 is a flowchart showing the operation of the sequential scheduler in detail.

FIG. 3 is a flowchart showing the operation of the sequential scheduler 32 in detail. The sequential scheduler 32 obtains the cumulative frame amount from the cumulative amount monitoring unit 36. The sequential scheduler 32 stores the identity of the previously selected queue buffer (hereinafter, "M") and searches the queue buffers 24 that store frames, starting from the M+1 queue buffer 24, to select the first queue buffer 24 that matches the condition (S10).

When any of the queue buffers 24 is selected (Y in S12), the sequential scheduler 32 reads one frame from the buffer (S14). The sequential scheduler 32 communicates the identity of the queue buffer 24 from which the frame was read and the size of the read frame to the cumulative amount monitoring unit 36. The cumulative amount monitoring unit 36 adds the frame size to the cumulative read amount of the queue buffer 24 (S15). The cumulative amount monitoring unit 36 subtracts the amount of read frame from the cumulative frame amount of the queue buffer 24 (not shown in FIG. 3).

If none of the queue buffers 24 is selected, i.e., none of the queue buffers 24 stores a frame (N in S12), S14 and S15 are skipped. When a condition to end the process (e.g., acknowledgment of a termination command) is not met yet (N in S16), a wait is enforced until a period (0.672 μs) elapses (N in S18). When the elapse of a period is detected (Y in S18), control is returned to S10. When the condition to end the process is met (Y in S16), the flow as shown is terminated.

Figure 4:
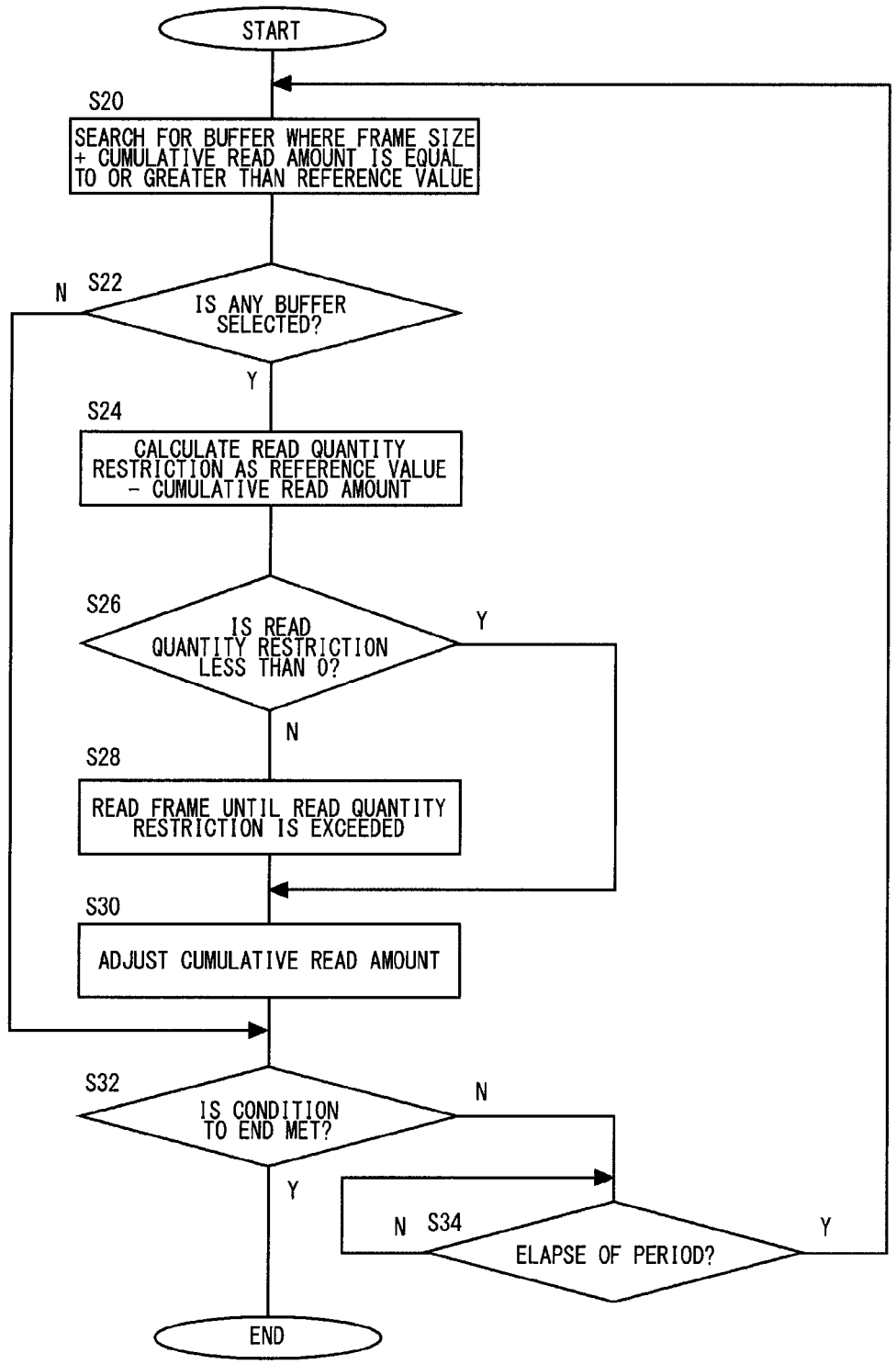
FIG. 4 is a flowchart showing the operation of the adjustment scheduler in detail.

FIG. 4 is a flowchart showing the operation of the adjustment scheduler 34 in detail. The adjustment scheduler 34 obtains the cumulative frame amount and the cumulative read amount of each queue buffer 24 from the cumulative amount monitoring unit 36. The adjustment scheduler 34 stores the identity of the previously selected queue buffer (hereinafter, "N") and searches the queue buffers 24, starting from the N+1 buffer 24, to select the queue buffer 24 where (the cumulative frame amount+the cumulative read amount) is equal to or more than the read reference value (840 bytes). The adjustment scheduler 34 selects the first queue buffer 24 that matches the condition (S20).

When any of the queue buffers 24 is selected as a target of read (Y in S22), the adjustment scheduler 34 calculates the read quantity restriction by subtracting the cumulative read amount from the read reference value (840 bytes) (S24). If the sequential scheduler 32 reads a frame from the same queue buffer 24 in the same period, the amount of frame read by the sequential scheduler 32 is also included in the cumulative read amount. If the read quantity restriction is equal to or more than 0 (N in S26), the adjustment scheduler 34 reads one or more frames from the queue buffer 24 from which to read a frame until the read quantity restriction is exceeded (S28). If the read quantity restriction is less than 0, i.e., if the cumulative read amount is more than the read reference value (Y in S26), S28 is skipped and the frame is not read.

The adjustment scheduler 34 communicates the identity of the queue buffer 24 from which the frame was read and the size of the read frame to the cumulative amount monitoring unit 36. The cumulative amount monitoring unit 36 adds a value obtained by subtracting the read reference value (840 bytes) from the amount of read frame to the cumulative read amount of the queue buffer 24 the identity of which is communicated (S30). If the amount of read frame is less than 840 bytes, the cumulative amount monitoring unit 36 decreases the cumulative read amount from the previous level. The cumulative amount monitoring unit 36 subtracts the amount of read frame from the cumulative frame amount of the queue buffer 24 the identity of which is communicated (not shown in FIG. 4).

If none of the queue buffers 24 is selected, i.e., if no queue buffers where (the cumulative frame amount+the cumulative read amount) is equal to or more than the read reference value (840 bytes) are identified (N in S22), S22 through S30 are skipped. When a condition to end the process (e.g., acknowledgment of a termination command) is not met yet (N in S32), a wait is enforced until a period (0.672 μs) elapses (N in S34). When the elapse of a period is detected (Y in S34), control is returned to S20. When the condition to end the process is met (Y in S32), the flow as shown is terminated.

A description will now be given, with reference to FIGS. 5 and 6, of specific examples of reading frames in the communication device 10 according to the embodiment. In this example, queue buffers #1-#10 store frames indicated by the stored frame fields. The queue buffer #4 initially stores one 500-byte frame. As described below, one 500-byte frame is added and stored at a later point of time. The illustrated frame size of 84 bytes results from adding the inter-frame gap and the preamble to the minimum Ethernet frame size. It is additionally assumed that M+1 of the sequential scheduler 32 and N+1 of the adjustment scheduler 34, i.e., the first queue buffer to be visited by the schedulers in a search, is the queue buffer #1.

Each entry in the fields in FIG. 5 provided for respective periods indicates "type of scheduler that reads the frame"–"number of read frames"–"cumulative read amount". S1 denotes the sequential scheduler 32 and S2 denotes the adjustment scheduler 34.

In the first period, the scheduler 32 selects the queue buffer #1 and reads one 84-byte frame. The adjustment scheduler 34 searches for a queue buffer where the cumulative frame amount is 840 bytes or more and selects the queue buffer #5 accordingly. The adjustment scheduler 34 reads one 1000-byte frame, which exceeds 840 bytes, from the queue buffer #5. The sequential scheduler 32 and the adjustment scheduler 34 communicate the identity of the queue buffer from which the frame was read and the size of read frame to the cumulative amount monitoring unit 36. The cumulative amount monitoring unit 36 determines the cumulative read amount of the queue buffer #1 to be 84 bytes and the cumulative read amount of the queue buffer #5 to be 160 bytes (1000-840).

In the second period, the sequential scheduler 32 selects the queue buffer #2 and reads one 84-byte frame. The adjustment scheduler 34 selects the queue buffer #6 and reads one 1000-byte frame. The cumulative read amount of the queue buffer #2 is 84 bytes and the cumulative read amount of the queue buffer #6 is 160 bytes.

In the third period, the sequential scheduler 32 selects the queue buffer #3 and reads one 84-byte frame. The adjustment scheduler 34 selects the queue buffer #7 and reads one 1000-byte frame. The cumulative read amount of the queue buffer #3 is 84 bytes and the cumulative read amount of the queue buffer #7 is 160 bytes.

In the fourth period, the sequential scheduler 32 selects the queue buffer #4 and reads one 500-byte frame. The adjustment scheduler 34 selects the queue buffer #8 and reads frames until 840 bytes or more are read. As a result two 500-byte frames are read. The cumulative read amount of the queue buffer #4 is 500 bytes and the cumulative read amount of the queue buffer #8 is 160 bytes.

In the fifth period, the sequential scheduler 32 selects the queue buffer #5 and reads one 1000-byte frame. The adjustment scheduler 34 selects the queue buffer #9 and reads two 500-byte frames. The cumulative read amount of the queue buffer #5 is 1160 bytes (160+1000) and the cumulative read amount of the queue buffer #9 is 160 bytes.

In the sixth period, the sequential scheduler 32 selects the queue buffer #6 and reads one 1000-byte frame. The adjustment scheduler 34 selects the queue buffer #10 and reads two 500-byte frames. The cumulative read amount of the queue buffer #6 is 1160 bytes and the cumulative read amount of the queue buffer #10 is 160 bytes.

It will be assumed that a 500-byte frame is newly stored in the queue buffer #4. In the seventh period, the sequential scheduler 32 selects the queue buffer #7 and reads one 1000-byte frame. The adjustment scheduler 34 searches for the queue buffer where (the cumulative frame amount+the cumulative read amount) is equal to or more than 840 bytes, and selects the queue buffer #4. The adjustment scheduler 34 attempts to read a frame from the queue buffer #4 until (840 bytes–the cumulative read amount=500 bytes) is exceeded. As a result, one 500-byte frame is read. The cumulative read amount of the queue buffer #7 will be 1160 bytes. The cumulative read amount of the queue buffer #4 will be the initial cumulative read amount=500 bytes+(the amount of read frame=500 bytes–the read reference value=840 bytes)=160 bytes.

In the eighth period, the sequential scheduler 32 selects the queue buffer #8 and reads one 500-byte frame. The adjustment scheduler 34 searches for the queue buffer where (the cumulative frame amount+the cumulative read amount) is equal to or more than 840 bytes, and selects the queue buffer #5. Since the read reference value=840 bytes–the cumulative read amount=1160 bytes<0 in the queue buffer #5, the adjustment scheduler 34 skips the step of reading a frame. The cumulative read amount of the queue buffer #8 will be 660 bytes (160+500). The cumulative read amount of the queue buffer #5 will be the initial cumulative read amount=1160 bytes+(the amount of read frame=0 bytes–the read reference value=840 bytes)=320 bytes.

In the ninth period, the sequential scheduler 32 selects the queue buffer #9 and reads one 500-byte frame. The adjustment scheduler 34 searches for the queue buffer where (the cumulative frame amount+the cumulative read amount) is equal to or more than 840 bytes, and selects the queue buffer #6. Since the read reference value=840 bytes–the cumulative read amount=1160 bytes<0 in the queue buffer #6, the adjustment scheduler 34 skips the step of reading a frame. The cumulative read amount of the queue buffer #9 will be 660 bytes (160+500). The cumulative read amount of the queue buffer #6 will be the initial cumulative read amount=1160 bytes+(the amount of read frame=0 bytes–the read reference value=840 bytes)=320 bytes.

In the tenth period, the sequential scheduler 32 selects the queue buffer #10 and reads one 500-byte frame. The adjustment scheduler 34 searches for the queue buffer where (the cumulative frame amount+the cumulative read amount) is equal to or more than 840 bytes, and selects the queue buffer #7. Since the read reference value=840 bytes–the cumulative read amount=1160 bytes<0 in the queue buffer #7, the adjustment scheduler 34 skips the step of reading a frame. The cumulative read amount of the queue buffer #10 will be 660 bytes (160+500). The cumulative read amount of the queue buffer #7 will be the initial cumulative read amount=1160 bytes+(the amount of read frame=0 bytes–the read reference value=840 bytes)=320 bytes.

In the eleventh period, the sequential scheduler 32 selects the queue buffer #8, which stores a frame, and reads one 500-byte frame. The adjustment scheduler 34 searches for the queue buffer where (the cumulative frame amount+the cumulative read amount) is equal to or more than 840 bytes, and selects the same queue buffer #8. Since the read reference value=840 bytes–the initial cumulative read amount=660 bytes–the amount read by the sequential scheduler 32=500 bytes<0 in the queue buffer #8, the adjustment scheduler 34 skips the step of reading a frame. The cumulative read amount of the queue buffer #8 will be be initial cumulative read amount=660 bytes+the amount read by the sequential scheduler 32=500 bytes+(the amount of frame read by the adjustment scheduler 34=0 bytes–the read reference value=840 bytes)=320 bytes.

In the twelfth period, the sequential scheduler 32 selects the queue buffer #9, which still stores a frame, and reads one 500-byte frame. The adjustment scheduler 34 searches for the queue buffer where (the cumulative frame amount+the cumulative read amount) is equal to or more than 840 bytes, and selects the same queue buffer #9. Since the read reference value=840 bytes−the initial cumulative read amount=660 bytes−the amount read by the sequential scheduler 32=500 bytes<0 in the queue buffer #9, the adjustment scheduler 34 skips the step of reading a frame. The cumulative read amount of the queue buffer #9 will be the initial cumulative read amount=660 bytes+the amount read by the sequential scheduler 32=500 bytes+(the amount of frame read by the adjustment scheduler 34=0 bytes−the read reference value=840 bytes)=320 bytes.

In the thirteenth period, the sequential scheduler 32 selects the queue buffer #10, which still stores a frame, and reads one 500-byte frame. The adjustment scheduler 34 searches for the queue buffer where (the cumulative frame amount+the cumulative read amount) is equal to or more than 840 bytes, and selects the same queue buffer #10. Since the read reference value=840 bytes−the initial cumulative read amount=660 bytes−the amount read by the sequential scheduler 32=500 bytes<0 in the queue buffer #10, the adjustment scheduler 34 skips the step of reading a frame. The cumulative read amount of the queue buffer #10 will be the initial cumulative read amount=660 bytes+the amount read by the sequential scheduler 32=500 bytes+(the amount of frame read by the adjustment scheduler 34=0 bytes−the read reference value=840 bytes)=320 bytes.

The amount of frames and the cumulative amount read from the queue buffers in the thirteen periods are as follows.

Queue buffer #1: the amount of read frames: 84 bytes, the cumulative read amount 84 bytes
Queue buffer #2: the amount of read frames: 84 bytes, the cumulative read amount 84 bytes
Queue buffer #3: the amount of read frames: 84 bytes, the cumulative read amount 84 bytes
Queue buffer #4: the amount of read frames: 1000 bytes, the cumulative read amount 160 bytes
Queue buffer #5: the amount of read frames: 2000 bytes, the cumulative read amount 320 bytes
Queue buffer #6: the amount of read frames: 2000 bytes, the cumulative read amount 320 bytes
Queue buffer #7: the amount of read frames: 2000 bytes, the cumulative read amount 320 bytes
Queue buffer #8: the amount of read frames: 2000 bytes, the cumulative read amount 320 bytes
Queue buffer #9: the amount of read frames: 2000 bytes, the cumulative read amount 320 bytes
Queue buffer #10: the amount of read frames: 2000 bytes, the cumulative read amount 320 bytes The output band corresponding to the thirteen periods and defined by the frame amount is 840 bytes □ 13=10920 bytes. Dividing this figure equally between the ten queue buffers obtains 1092 bytes/queue buffer. However, the queue buffers #1-#4 do not store 1092-byte frames so that mere cyclic visiting by the sequential scheduler 32 creates unused output band. The unused amount will be 1092 □ 4−(84 bytes □ 3+1000 bytes)=3116 bytes. The queue buffers #5-#10 of the communication device 10 will be using 1092 bytes □ 6+3116 bytes=9668 bytes in a balanced manner.

In the above example, the queue buffers #5-#10 differ in the amount of frames stored. Nevertheless, the same amount of frame is read from the buffers, demonstrating the band is used in a balanced manner. In spite of the fact that the queue buffers #1-#4 initially store frames less than 840 bytes, the frames are read without a wait for storage of 840-byte frame data. The total amount of read frames is 13252 bytes, and the total cumulative read amount is 2332 bytes. Subtracting the latter from the former obtains 10920 bytes, which matches the frame amount defining the output band occurring during the thirteen cycles. Thus, frames are read without wasteful use of the output band.

According to the communication device 10 of the embodiment, the sequential scheduler 32 reads one frame per visit to each queue buffer. Therefore, balance in the amount of frames read from a plurality of queue buffers can be easily maintained. Since the adjustment scheduler 34 read frames in parallel with the sequential scheduler 32, unused output band is less likely to occur even if the sequential scheduler 32 operates at a speed lower than the communication speed of the communication device. In other words, the output band of the communication device is fully exploited and compatibility with higher speed of the communication device is facilitated.

According to the communication device 10, it is ensured that the larger the cumulative amount of read frames in a given queue buffer, the smaller the amount of frames read by the adjustment scheduler 34 from that queue buffer. This further helps maintain the balance in reading frames from a plurality of queue buffers.

In further accordance with the communication device 10, the scheduler 34 skips the process of reading a frame from a queue buffer if the cumulative amount of read frame in that queue buffer exceeds a predetermined value (e.g., the read reference value of 840 bytes). The adjustment scheduler 34 decreases the cumulative read amount of that queue buffer from the previous level (e.g., subtracts the read reference value of 840 bytes). This increases the chance that the adjustment scheduler 34 reads a frame from that buffer in the next visit so that it will be easy to strictly maintain balance in the amount of reading frames from a plurality of queue buffers.

To achieve balanced reading using the output band of 10 Gbps in the communication device 10, 0.672 μs, which is the shortest frame time at the 1 Gbps speed, need be secured for the sequential scheduler 32 and the adjustment scheduler 34 to determine the queue buffer from which to read the next frame. In the related-art approach using a WWR queue to read frames, determination of the queue buffer from which to read the next frame at periods of 0.672 μs can only result in the output band of 1 Gbps. It should therefore be appreciated that the technique proposed in the communication device 10 achieves balanced reading at a high-speed output band more easily than the related art and is suitably used in communication devices having a high-speed interface.

Described above is an explanation based on an exemplary embodiment. The embodiment is intended to be illustrative only and it will be obvious to those skilled in the art that various modifications to combinations of constituting elements and processes could be developed and that such modifications are also within the scope of the present invention.

The communication device 10 according to the embodiment is provided with the sequential scheduler 32 configured to read one frame per a visit to each queue buffer such that the amount read is defined by the minimum frame size. The device 10 is further provided with the adjustment scheduler 34 configured to read one or more frames per a visit to each queue buffer such that the amount read is defined by read reference value of 840 bytes (in this case, the "first read reference value"). In one variation, the communication device 10 may further be provided with an intermediate scheduler configured to read one or more frames per a visit to each queue buffer such that the amount read is defined by a reference value (in this case, the "second read reference value") larger than the shortest frame size and smaller than the first read reference value.

A description of an exemplary communication device 10 according to a variation in which one intermediate scheduler is further provided. The second read reference value may be substantially in the middle of the shortest frame size and the read reference value. Alternatively, the second read reference value may be approximately half the read reference value. In this case, it will be assumed that the second read reference value is 420 bytes.

The intermediate scheduler operates in the same way as the sequential scheduler 32. The intermediate scheduler reads one or more pieces of frame data until the second read reference value of 420 bytes is exceeded per a visit to each queue buffer and communicates the identification information of the queue buffer and the amount of read frame to the cumulative amount monitoring unit 36. The cumulative amount monitoring unit 36 directly adds the amount read by the sequential scheduler 32 and the intermediate scheduler to the cumulative read amount of each queue buffer. As in the case of the embodiment, the adjustment scheduler 34 ensures that the larger the cumulative read amount, the smaller the read quantity restriction. Consequently, the amount of frame read by the adjustment scheduler 34 is reduced.

According to the embodiment, the amount read by the adjustment scheduler 34 at a time may grow large. In other words, the burst amount of frame in each queue buffer may grow large. This creates a need to process a large amount of data at a time in the other communication device 12, etc. that receives the output frame from the communication device 10. As a result, the processing load in the other communication device 12 may be increased temporarily, causing delay in processing. According to the variation, it is easy to ensure uniform amount of frames output from the communication device 10 per a period, by providing the intermediate scheduler that uses a reference value intermediate between the reference value of the sequential scheduler 32 and that of the adjustment scheduler 34. This ensure uniform processing load in the other communication devices 12 and reduces the likelihood of processing delay.

It will be understood to a skilled person that the functions achieved by the constituting elements recited in the claims are implemented either alone or in combination by the constituting elements shown in the embodiment and the variation.

What is claimed is:

1. A communication device comprising:
a plurality of frame buffers, each configured to store input frames from one or more communication channels; and
first and second schedulers configured to cyclically visit the plurality of frame buffers to read a frame from each frame buffer to output to another communication device,
wherein the first scheduler reads one frame per visit to each frame buffer at a speed lower than a communication speed of the communication device, and
the second scheduler, in parallel with the first scheduler, reads one or more frames per visit to each frame buffer such that read quantity of the second scheduler is defined by a reference value greater than the shortest frame size.

2. The communication device according to claim 1, further comprising:
a cumulative amount monitoring unit configured to store, for each of the plurality of frame buffers, a cumulative read amount defined by a cumulative amount of frames read at least by the first scheduler,
the larger the cumulative read amount of a given frame buffer, the smaller the read quantity value of the second scheduler on reading from the frame buffer.

3. The communication device according to claim 2,
wherein, when the cumulative read amount of a given frame buffer exceeds a predetermined value, the second scheduler skips the process of reading a frame from the frame buffer, and when the step of reading a frame from the frame buffer is skipped, the cumulative amount monitoring unit decreases the cumulative read amount of the frame buffer from the previous level.

4. A communication device comprising:
a plurality of frame buffers, each configured to store input frames from one or more communication channels;
first and second schedulers configured to cyclically visit the plurality of frame buffers to read a frame that should be output from each frame buffer to another communication device; and
a third scheduler configured to cyclically visit the plurality of frame buffers to read a frame for external output from each frame buffer,
wherein the first scheduler reads one frame per visit to each frame buffer at a speed lower than a communication speed of the communication device,
wherein the second scheduler reads one or more frames per visit to each frame buffer such that read quantity is defined by a reference value greater than the shortest frame size, and
wherein the third scheduler reads one or more frames such that a restriction on read quantity is defined by another reference value greater than the shortest frame size and smaller than the reference value of the second scheduler.

* * * * *